(12) United States Patent
Moon et al.

(10) Patent No.: US 6,917,017 B2
(45) Date of Patent: Jul. 12, 2005

(54) COUNTER-TOP COOKER HAVING MULTIPLE HEATING ELEMENTS

(75) Inventors: Jung S. Moon, Buffalo Grove, IL (US); Rong Liu, Gurnee, IL (US); Kitak Chae, Seoul (KR); Jongrok Kim, Seoul (KR)

(73) Assignee: Heartware Home Products, Inc., Gurnee, IL (US)

( * ) Notice: Subject to any disclaimer, the term of this patent is extended or adjusted under 35 U.S.C. 154(b) by 94 days.

(21) Appl. No.: 10/226,695

(22) Filed: Aug. 23, 2002

(65) Prior Publication Data

US 2004/0035845 A1 Feb. 26, 2004

(51) Int. Cl.$^7$ ................................................. A21B 1/00
(52) U.S. Cl. ........................ 219/400; 219/385; 219/395; 219/411; 219/402; 219/428; 219/434; 219/398; 126/21 A; 126/21 R
(58) Field of Search ........................ 219/400, 385–386, 219/391, 395, 398, 411, 494, 402–404, 428–430, 434; 126/21 A, 21 R

(56) References Cited

U.S. PATENT DOCUMENTS

| | | | |
|---|---|---|---|
| 2,848,592 A | 8/1958 | Mergen | |
| 2,893,307 A | 7/1959 | Rodriguez | |
| 3,281,575 A | 10/1966 | Ferguson, Jr. | |
| 4,629,850 A | 12/1986 | Tanabe | |
| 4,663,517 A | 5/1987 | Huff et al. | |
| 5,485,780 A | * 1/1996 | Koether et al. | ............... 99/419 |
| 5,534,681 A | 7/1996 | Hwang | |
| 5,548,102 A | 8/1996 | Kwon | |
| 5,735,190 A | 4/1998 | Sham | |
| 5,747,781 A | 5/1998 | Kim et al. | |
| 5,793,023 A | 8/1998 | Hong et al. | |
| 5,801,357 A | 9/1998 | Danen | |
| 5,801,362 A | 9/1998 | Pearlman et al. | |
| 6,069,345 A | * 5/2000 | Westerberg | ................. 219/411 |
| 6,201,217 B1 | * 3/2001 | Moon et al. | ................ 219/386 |
| 6,363,836 B1 | 4/2002 | Usherovich | |

* cited by examiner

Primary Examiner—Shawntina Fuqua
(74) Attorney, Agent, or Firm—Greer, Burns & Crain, Ltd.

(57) ABSTRACT

A counter-top cooker includes a base, a cooking chamber having a top end and a bottom end supported on the base, and a power head attached to the top end of the cooking chamber. The power head includes a heating element and a fan for directing airflow over the heating element and into the cooking chamber. The cooker also includes another heating element provided in the cooking chamber proximate the bottom end of the cooking chamber.

23 Claims, 5 Drawing Sheets

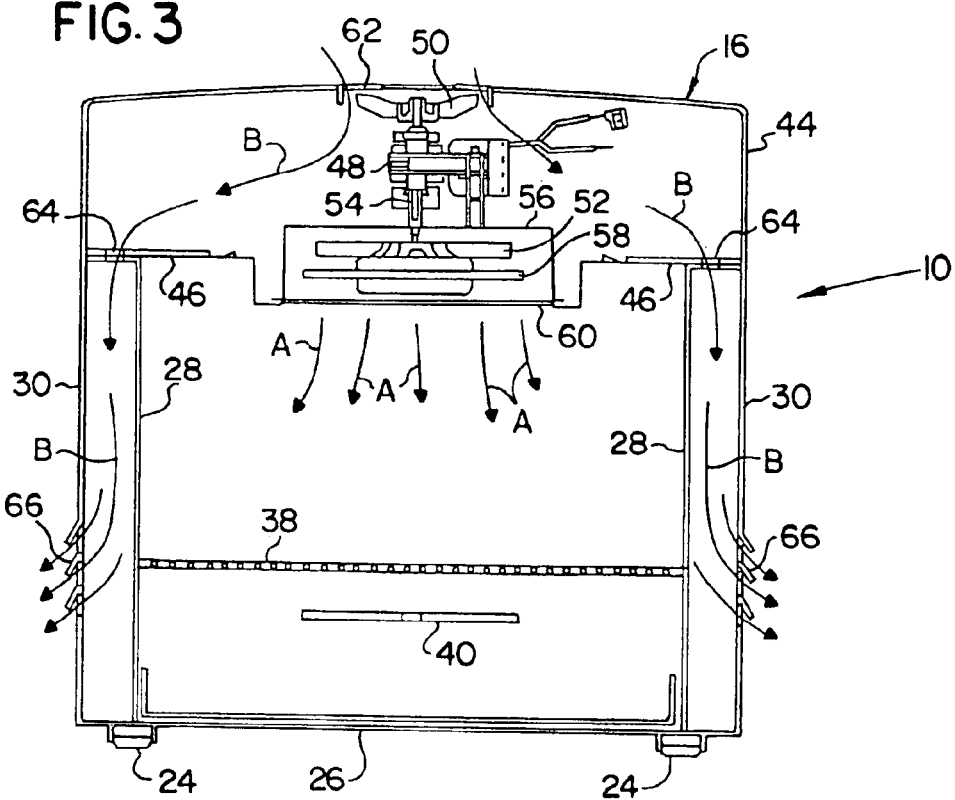
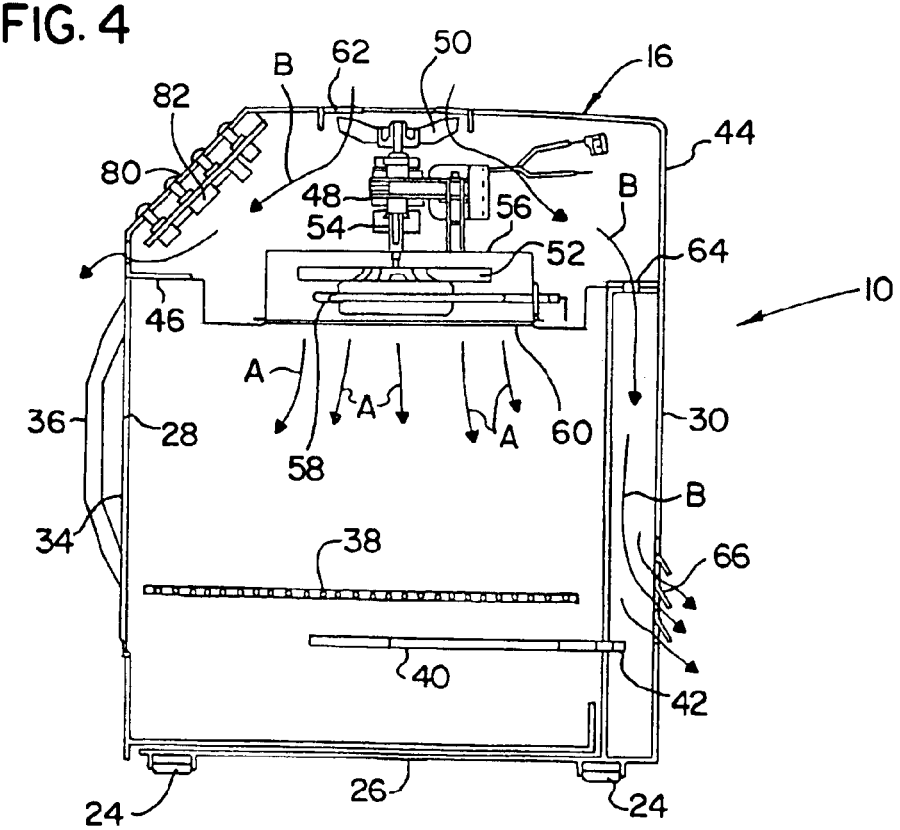

COUNTER-TOP COOKER HAVING MULTIPLE HEATING ELEMENTS

FIELD OF THE INVENTION

This invention relates to counter-top cookers, and in particular to a counter-top electric cooker having a radiant heating element in addition to the convection heating element in a power head.

BACKGROUND OF THE INVENTION

Counter-top electric cookers or ovens are known in the art. In comparison to conventional ovens, counter-top cookers offer the advantage of being less bulky and having quicker cooking times. Typically, the counter-top cookers include a power head having an electric heating unit that generates heat in the cooking enclosure. To reduce the cooking time, counter-top cookers typically will rely on a hot air stream that is produced by a high speed fan provided in the power head upstream of an electric heating element, or by utilizing an infrared heating element in combination with a relatively low speed fan that generates sufficient air circulation in the oven to cook the food.

In types of cooking such as roasting or broiling, it is desirable to expose the food item to direct radiant heat to obtain even cooking and color. To achieve this result, it is necessary in the known counter-top cooker to rotate the food items periodically, so that they are exposed to the heating element in the power head at the top of the cooker. Also, while the known counter-top cookers do cook faster than conventional ovens, the cooking time is still considered by some to be long enough that it does not act as an incentive to purchase the counter-top cookers.

SUMMARY OF THE INVENTION

The present invention relates to a counter-top cooker including a base, a cooking chamber having a top end and a bottom end supported on the base, and a power head attached to the top end of the cooking chamber. The power head includes a heating element and a fan for directing airflow over the heating element and into the cooking chamber. The cooker also includes another heating element provided in the cooking chamber proximate the bottom end of the cooking chamber.

BRIEF DESCRIPTION OF THE DRAWINGS

FIG. 3 is a sectional view of the oven of FIG. 1, shown generally along line 3—3;

FIG. 4 is a sectional view of the oven of FIG. 1, shown generally along line 4—4 and with an alternate embodiment of a control panel;

DETAILED DESCRIPTION OF THE INVENTION

Figure 1:
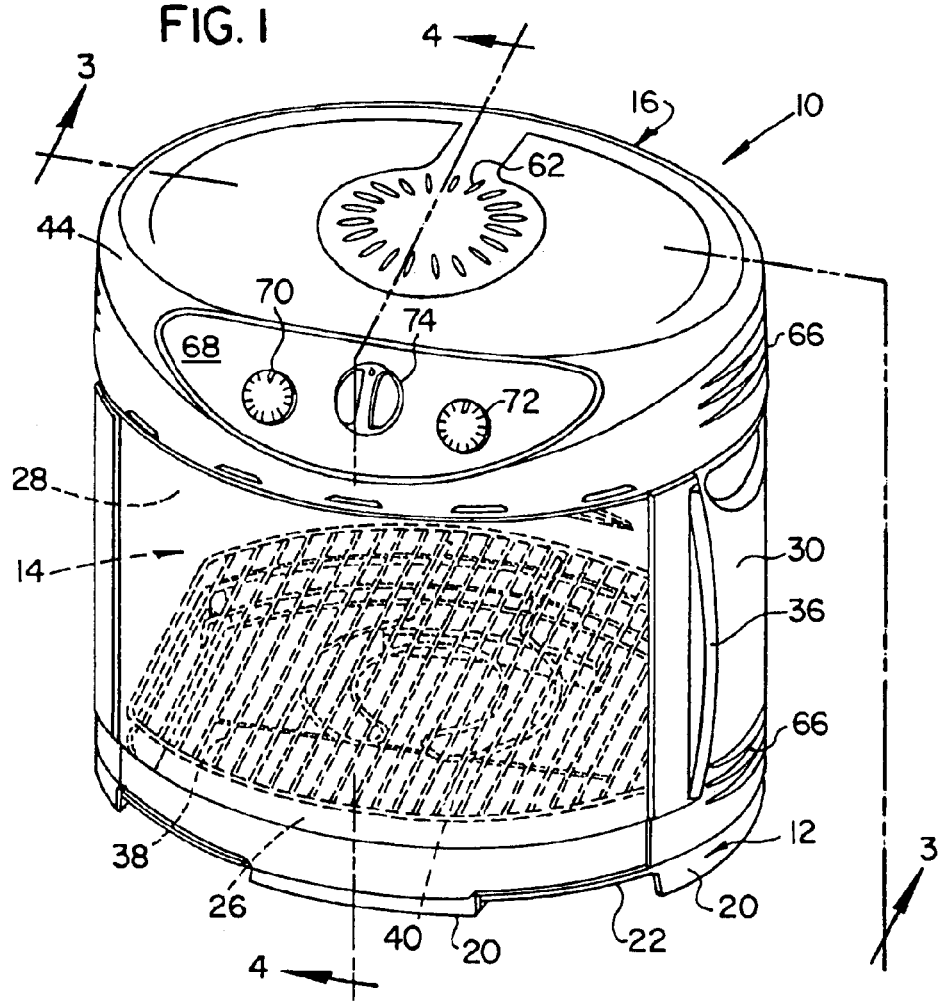
FIG. 1 is a perspective view of a counter-top oven in accordance with one embodiment of the invention.
Figure 2:
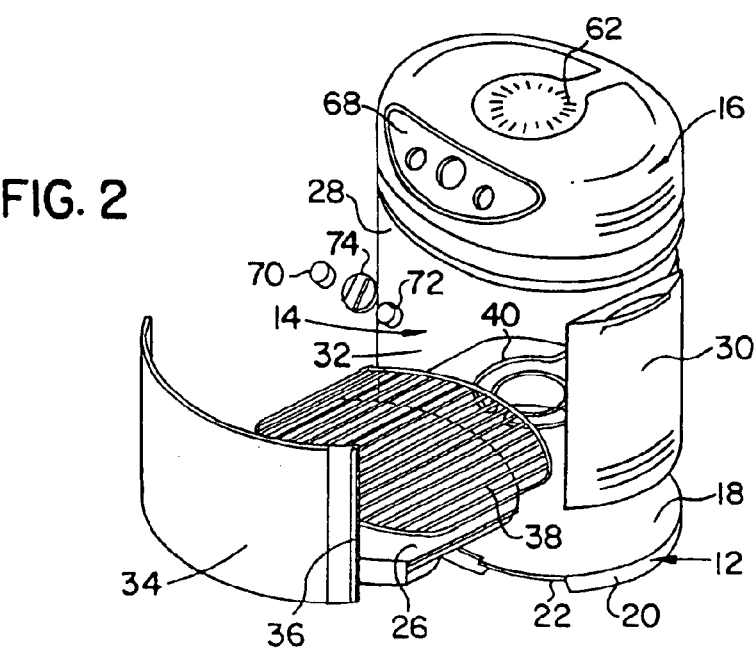
FIG. 2 is a partial exploded perspective view of the oven shown in FIG. 1.

Turning to FIGS. 1 and 2, the counter-top cooker or oven in accordance with one embodiment of the present invention is indicated generally at 10, and includes a base 12, a cooking chamber 14 and a power head 16. The base 12 includes a generally planar top surface 18 and a plurality of supports 20 on the opposite side of the top surface. The supports 20 are adapted to rest on a surface, a countertop, for example, and insulate the surface from the heat generated in the cooking chamber 14. Rubber feet 24 (best shown in FIGS. 3 and 4) may be attached to the supports 20 to prevent the oven 10 from sliding.

The cooking chamber is 14 is defined by a generally oval-shaped drip pan 26 that removably slides into the cooking chamber 14 and onto the top of the base 12, and a vertical inner wall 28 which surrounds the bottom of the cooking chamber and extends upwardly from the base. In the preferred embodiment, the drip pan 26 is made of aluminum, and the inner wall 28 is made of aluminum or steel. The top of the cooking chamber 14 is attached to and enclosed by the power head 16. A vertical outer wall 30 is generally spaced parallel to the inner wall 28 (best shown in FIG. 3) to insulate the high temperature within the cooking chamber 14 and protect the user from the heat when the cooker is in operation. The outer wall 30 is preferably made of thermoplastic such as PP. The cooking chamber 14 includes an opening 32 on one side of the vertical wall, preferable on one of the two wider sides of the vertical walls 28, 30, to provide access to the interior of the cooking chamber. A door 34 is provided at the opening 32, and at one end is hinged to the outer wall 30. A handle 36 is located at the opposite end, so that the door 34 swings open and closed. Preferably, the door 34 is made of transparent glass (that can withstand the high temperatures) to enable the user to view inside the cooking chamber 14.

Turning now to FIGS. 3 and 4, a cooking rack 38 is provided for supporting the food item (not shown). The rack 38 is generally oval-shaped to correspond with the interior shape of the cooking chamber 14 and is configured to be supported by grooves (not shown) formed on the inner vertical wall 28, or brackets (not shown) secured to the inner vertical wall. The rack 38 is preferably a planar grid made from stainless steel with a suitable non-stick PTFE coating. Alternatively, the rack 38 may also be a flat pan or a griddle. The drip pan 26 serves to catch food particles and drippings from food items placed on the cooking rack 38.

In accordance with one embodiment of the present invention, a heating element 40 is provided under and on the opposite side of the cooking rack 38 from the power head 16. In the preferred embodiment, the heating element 40 is configured generally to resemble two concentric circles (best shown in FIG. 1), but can have any of numerous shapes. The heating element 40 is attached and supported at its two ends 42 to the inner wall 28 of the cooking chamber 14 at the opposite side from the door 34, so that the heating element extends generally horizontally and is spaced parallel with the cooking rack 38. The ends 42 of the heating element 40 are connected to a power supply (not shown) that supplies current to the heating element. The heating element 40 is preferably a ceramic-coated infrared heater, but can be any other type of known electric heating element. Specifically, the preferred heating element is made of an incoloy 840 material coated with a G-1500 (CRC 1500) ceramic coating. The ceramic coating increases the emissive power of the heating element 40 and shifts the emission spectrum to the infrared range. Preferably, the heating element 40 is adapted to produce oven temperatures in the range from approximately 80° C. to approximately 250° C.

Referring still to FIGS. 3 and 4, the power head 16 includes a generally oval exterior housing assembly 44 (best shown in FIG. 1), and an inwardly extending interior housing 46 which attaches to the top of the cooking chamber 14. The power head 16 further includes a motor 48 for driving a cooling fan 50 and an oven fan 52 via a common shaft 54. The oven fan 52 is provided in a heater/fan housing 56 and directly above a top heating element 58, which is also provided in the heater/fan housing. The top heating element 58 is also preferably a ceramic-coated infrared heater, although other types of heaters may also be used. Also, the two heating elements (40, 58) may be of the same type, or may be different from each other. The heater/fan housing 56 separates the top heating element 58 and the oven fan 52 from the interior of the power head 16, but is open to the cooking chamber 14. Thus, the heated airflow is directed in a downward direction into the cooking chamber 14, as shown by arrows A. A protective grid or cover 60 with a plurality of openings is secured to the heater/fan housing 56 at the opening.

The cooling fan 50 pulls ambient air into the interior of the power head 16 through openings 62 on the top of the exterior housing assembly 44, as shown by arrows B, and directs the airflow through holes 64 which extend through the interior housing 46 and into the space between the inner and the outer walls 28, 30 of the cooking chamber 14. The airflow carries heat that builds up in the power head 16 and within the space between the inner and the outer walls 28, 30, and exits the cooker 10 through a plurality of vent openings 66 formed in the outer wall 30 near the base 12. Additional vent openings 66 (best shown in FIG. 1) may also be formed in the exterior housing assembly 44 to further assist in expressing hot air.

Referring back to FIG. 1, the power head 16 also includes a control panel 68 located on the exterior housing assembly 44 generally above the door 34, and includes a set switch 70 for setting the temperature of the top heating element 58, and a set switch 72 for setting the temperature of the bottom heating element 40. A timer switch 74 is used to set the cooking time. In the preferred embodiment, the timer switch 74 is a mechanical timing device, and the temperature set switches 70, 72 are varistors.

Figure 5:
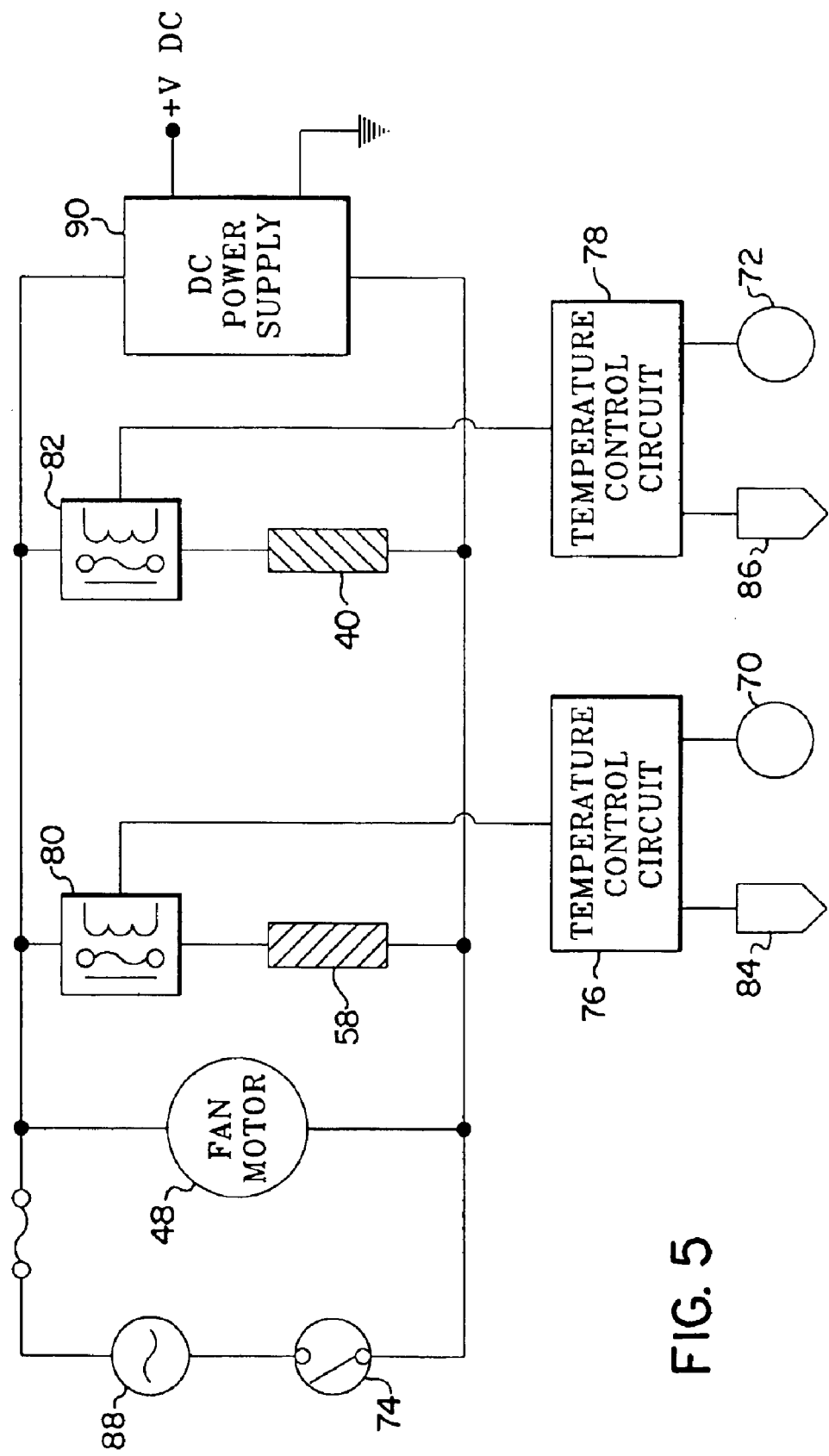
FIG. 5 is a schematic block diagram of the counter-top oven in accordance with one embodiment of the present invention.

Turning now to FIG. 5, the set switches 70, 72 are connected respectively to temperature control circuits 76, 78, which operatively control the operation of the power relays 80, 82 based on respective input signals from the set switches and temperature sensors 84, 86. The temperature sensors 84, 86 are preferably thermistors and are positioned near their corresponding heating elements 58, 40. The power relays 80, 82 operate to connect and disconnect power to and from the top and bottom heaters 58, 40, respectively, from an AC power source 88 (e.g., 120 VAC, 60 HZ). A DC power supply 90 provides operational power (e.g., 12 VDC) to the temperature control circuits 76, 78 by converting and transforming power from the AC power source 88 into DC. Power from the AC power source 88 is also supplied to the fan motor 58 when the timer switch 74 is activated.

In operation, the desired temperatures for the top and/or bottom heating elements 58, 40 are set by the set switch 70 and/or the set switch 72. When the desired cooking time is set by the timer switch 74, power is supplied to one or both of the heating elements 58, 40 activated by the corresponding set switches 70, 72, and allows the heating element(s) to reach the set temperature(s). Setting the cooking time with the timer switch 74 also activates the fan motor 48 to drive the oven fan 52 for providing convection heat to the food item being cooked. The fan motor 48 also drives the cooling fan 50 for dissipating heat inside the power head 16 and in the space between the inner and the outer walls 28, 30 of the cooking chamber 14. Independently adjusting the heat generated by the top and the bottom heating elements 58, 40 offers the user more control over variety of cooking functions such as broiling, baking, roasting, etc.

Figure 6:
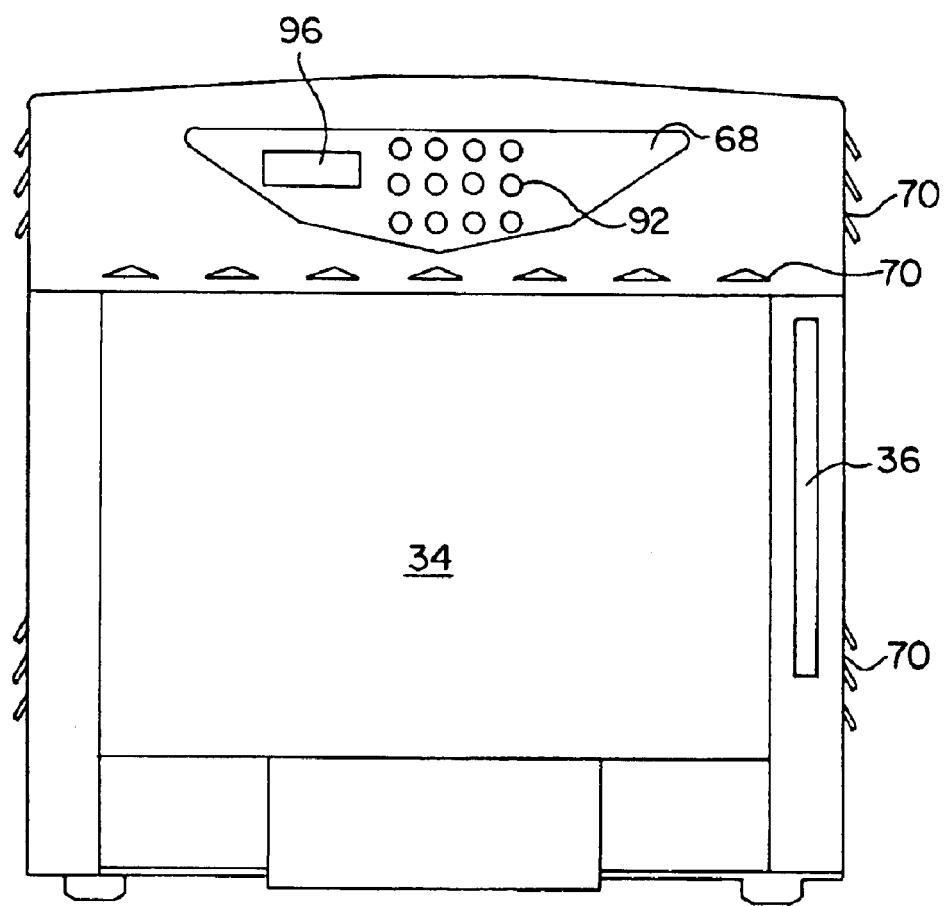
FIG. 6 is a front view of the oven of FIG. 1 showing the embodiment of the control panel shown in FIG. 4.
Figure 7:
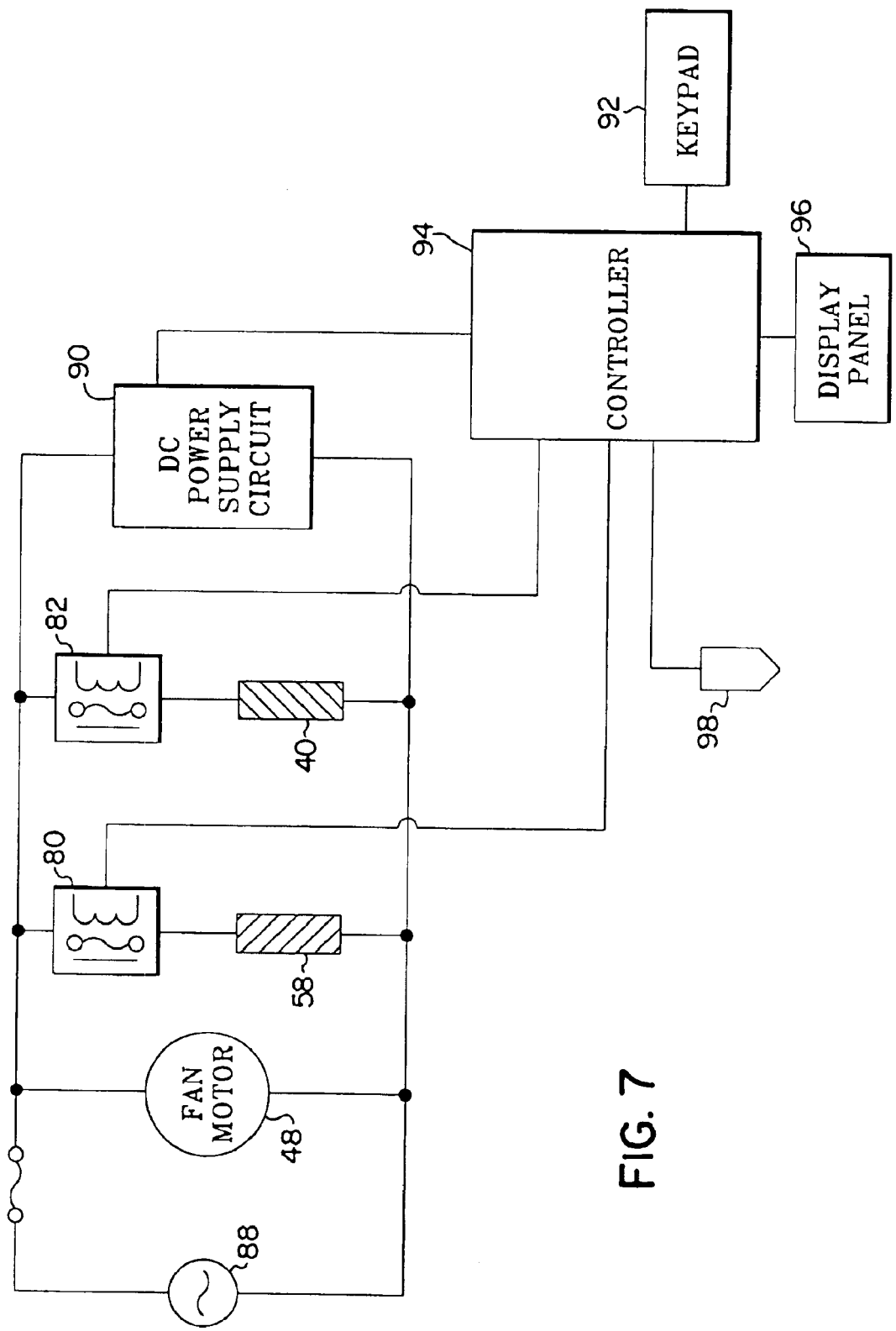
FIG. 7 is a schematic block diagram of the counter-top oven shown in FIG. 6.

Turning now to FIGS. 6 and 7, and in accordance with another embodiment of the present invention, a digital keypad 92 is provided on the control panel 68 for setting the operation of the cooker 10. The keypad 92 is used to enter at least the cooking temperatures, the cooking time and a start/stop signal. Data entered through the keypad 92 is processed by a programmable microprocessor or controller 94 (best shown in FIG. 7) provided behind the keypad 92. A display panel 96 shows data pertinent to the operation of the cooker, for example, temperatures and cooking time entered through the keypad 92, the remaining cooking time, etc. A temperature sensor 98 is located in the cooking chamber 14 to measure the cooking temperature.

In the preferred embodiment, the key pad 92 includes preset keys for performing various types of cooking, for example, a bake key, a broil key, a roast key, a key for combining baking and broiling, etc. The controller 94 automatically allocates a predetermined percentage of power to the top and the bottom heating elements 58, 40 when the preset keys are depressed by the user. For example, a "BAKE" key might allocate 70% of the power needed to achieve the set temperature (entered by a separate key or keys on the keypad) to the bottom heating element 40 and 30% to the top heating element 58, and a "BROIL" key might allocate 80% of power to the top heating element and 20% to the bottom heating element.

When the preset keys are depressed, the top and the bottom heating elements 58, 40 are supplied with the predetermined percentage of power for corresponding percentage of the set time. For example, if a "BAKE" key allocates 70% of power to the bottom heating element 40 and 30% to the top heating element 58, and the cooking time has been set to 10 minutes, power will be supplied to bottom heating element for approximately 7 minutes and disconnected for 3 minutes, whereas the top heating element will be powered for 3 minutes and disconnected for 7 minutes. It should be noted that this is only one manner of allocating the percentage of power and that other methods can be programmed into the controller 94 to perform this function.

The keypad 92 also includes a "FROZEN FOOD" key, which when activated, automatically sets (via the controller 82) the temperature in the cooking chamber 12 to a predetermined temperature for a percentage of the set cooking time to defrost the food. The predetermined temperature is typically lower than the set cooking temperature, and is sufficiently low as to not burn the surface of the food item being defrosted and then cooked. In operation, when the "FROZEN FOOD" key is depressed, the temperature is automatically set to approximately 180° C., for example, for 50% of the cooking time entered by the user. In this manner, the time involved in cooking frozen food is reduced, and the occurrence of potential food contamination during the defrost process is prevented. Power distribution to the top and bottom heating elements 58, 40 as set by the preset keys would remain the same during the defrost and cooking stages.

From the foregoing description, it should be understood that an improved counter-top cooker or oven has been shown and described which has many desirable attributes and advantages. In addition to the top heating element in the power head, a bottom heating element is included to reduce cooking time and provide even cooking conditions.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A counter-top cooker, comprising:
   a base;
   a cooking chamber having a first end, and a second end supported on said base;
   a power head attached to said first end of said cooking chamber, and including a first heating element and a first fan for directing airflow over said first heating element and into said cooking chamber; and
   a second heating element provided in said cooking chamber proximate said second end.

2. The cooker as defined in claim 1, wherein said cooking chamber is defined by a first wall, a second wall spaced from said first wall and a door that opens for permitting access into said cooking chamber.

3. The cooker as defined in claim 2, wherein said door is transparent.

4. The cooker as defined in claim 1, wherein said power head includes a first housing having a second fan for generating airflow in said first housing, and a motor for driving said first and second fans.

5. The cooker as defined in claim 4 wherein said first housing further includes a second housing in which said first fan and said first heating element are provided, said second housing being in fluid communication with said cooking chamber.

6. The cooker as defined in claim 5 wherein said cooking chamber is defined by a first wall and a second wall spaced from said first wall and defining an inner space, said second wall having a plurality of openings, and said inner space between said first and second walls is in fluid communication with said inside of said first housing, so that said airflow generated by said second fan is directed through said inner space and out said plurality of openings on said second wall.

7. The cooker as defined in claim 1 wherein said first heating element and said second heating element are both infrared heaters.

8. The cooker as defined in claim 1 wherein said first heating element and said second heating element each comprise an incoloy 840 material coated with a G-1500 (CRC 1500) ceramic coating.

9. The cooker as defined in claim 8 wherein said ceramic coating includes one of $SiO_2$, $TiO_2$, and $Al_2O_3$, and an inorganic pigment.

10. The cooker as defined in claim 1 further including a cooking rack removably provided in said cooking chamber between said first and second heating elements.

11. The cooker as defined in claim 1 further including a control panel having a timer for setting a cooking time, a first temperature set switch for setting a temperature generated by said first heating element, and a second temperature set switch for setting a temperature generated by said second heating element.

12. The cooker as defined in claim 11 further including,
    a first temperature sensor located proximate said first heating element for detecting a temperature generated by said first heating element, a first temperature control circuit in communication with said first temperature set switch and said first temperature sensor for operatively controlling said first heating element, and
    a second temperature sensor located proximate said second heating element for detecting a temperature generated by said second heating element, a second temperature control circuit in communication with said second temperature set switch and said second temperature sensor for operatively controlling said second heating element.

13. The cooker as defined in claim 1 further including a control panel having a keypad for setting a temperature in said cooking chamber and a cooking time.

14. The cooker as defined in claim 13 further including a temperature sensor provided in said cooking chamber for measuring said temperature in said cooking chamber, and a controller in communication with said temperature sensor and said keypad for controlling said temperature in said cooking chamber.

15. The cooker as defined in claim 14 wherein said keypad includes a plurality of predefined keys that correspond to a plurality of predefined modes of cooking, and said controller supplies a predetermined amount of power to said first and second heating elements based on said predefined keys selected.

16. The cooker as defined in claim 15 wherein said controller supplies said predetermined amount of power by supplying a maximum power to one of said first and second heating elements for a first predetermined time while supplying no power to the other of said first and second heating elements, and supplying said maximum power to the other of said first and second heating elements for a second predetermined time while supplying no power to said one of said first and second heating elements.

17. The cooker as defined in claim 15 wherein one of said predefined keys activates a defrost mode which automatically changes a set cooking temperature to a predetermined temperature for a predetermined portion of a set cooking time, where said predetermined temperature is lower than said set cooking temperature.

18. The cooker as defined in claim 17, wherein after said predetermined portion of time at said predetermined temperature has elapsed, said controller resets the cooking temperature to the set cooking temperature for the remainder of said set cooking time.

19. A counter-top oven, comprising:
    a base;
    a cooking chamber having a top end, and a bottom end supported on said base;
    a power head attached to said top end of said cooking chamber, and including a first heating element and a first fan for directing airflow over said first heating element and into said cooking chamber for providing convection heat;
    a second heating element provided in said cooking chamber proximate said bottom end for providing radiant heat; and
    a cooking surface located between said power head and said second heating element for supporting a food item to be cooked in said cooking chamber.

20. The oven as defined in claim 19 further including a control panel provided on said power head and having a timer for setting a cooking time, a first temperature set switch for setting a temperature generated by said first heating element, and a second temperature set switch for setting a temperature generated by said second heating element.

21. The oven as defined in claim 19 further including a control panel having a keypad for setting a cooking time and a cooking temperature in said cooking chamber, a temperature sensor provided in said cooking chamber for measuring temperature in said cooking chamber, and a controller in communication with said temperature sensor and said keypad for controlling said temperature in said cooking chamber.

22. The oven as defined in claim 21 wherein said controller supplies a maximum power to one of said first and second heating elements for a first predetermined time while supplying no power to the other of said first and second heating elements, and supplies said maximum power to the other of said first and second heating elements for a second predetermined time while supplying no power to said one of said first and second heating elements, when said cooking temperature and said cooking time are set.

23. The oven as defined in claim 21, wherein:

said keypad includes a plurality of predefined keys that correspond to a plurality of predefined modes of cooking; and said controller supplies a predetermined amount of power to said first and second heating elements based upon said predefined keys selected;

wherein one of said predefined keys activates a defrost mode which automatically changes a set cooking temperature to a predetermined temperature for a predetermined portion of a set cooking time, where said predetermined temperature is lower than said set cooking temperature, and further wherein after said predetermined portion of time at said predetermined temperature has elapsed, said controller resets the cooking temperature to the set cooking temperature for the remainder of said set cooking time.

* * * * *